United States Patent
Clemen et al.

(10) Patent No.: US 11,549,862 B2
(45) Date of Patent: Jan. 10, 2023

(54) MEASURING DEVICE COMPRISING AT LEAST ONE FLUID CHANNEL FOR GUIDING A MEASUREMENT FLUID

(71) Applicant: Rolls-Royce Deutschland Ltd & Co KG, Blankenfelde-Mahlow (DE)

(72) Inventors: Carsten Clemen, Mittenwalde (DE); Miklos Gerendas, Am Mellensee (DE)

(73) Assignee: ROLLS-ROYCE DEUTSCHLAND LTD & CO KG, Blankenfel de-Mahlow (DE)

( * ) Notice: Subject to any disclaimer, the term of this patent is extended or adjusted under 35 U.S.C. 154(b) by 892 days.

(21) Appl. No.: 16/419,523

(22) Filed: May 22, 2019

(65) Prior Publication Data

US 2019/0360895 A1 Nov. 28, 2019

(30) Foreign Application Priority Data

May 28, 2018 (DE) ...................... 10 2018 112 722.7

(51) Int. Cl.
| | | |
|---|---|---|
| *G01M 15/09* | (2006.01) | |
| *G01F 1/684* | (2006.01) | |
| *B33Y 10/00* | (2015.01) | |
| *G01K 1/14* | (2021.01) | |

(52) U.S. Cl.
CPC ........... *G01M 15/09* (2013.01); *G01F 1/6842* (2013.01); *G01K 1/14* (2013.01); *B33Y 10/00* (2014.12)

(58) Field of Classification Search
CPC ...... G01M 15/09; G01F 1/6842; B33Y 10/00; B33Y 80/00; B22F 5/009; B22F 5/10
See application file for complete search history.

(56) References Cited

U.S. PATENT DOCUMENTS

| | | | |
|---|---|---|---|
| 2003/0182998 A1 | 10/2003 | Goto et al. | |
| 2009/0014360 A1* | 1/2009 | Toner | G01N 15/10 |
| | | | 209/208 |
| 2016/0318129 A1* | 11/2016 | Hu | B22F 10/20 |
| 2017/0191901 A1 | 7/2017 | Lunel et al. | |

FOREIGN PATENT DOCUMENTS

| | | |
|---|---|---|
| DE | 10245134 A1 | 10/2003 |
| DE | 102008025869 A1 | 12/2009 |
| GB | 2521048 A | 6/2015 |
| WO | 2015181499 A1 | 12/2015 |

OTHER PUBLICATIONS

German Search Report dated Mar. 15, 2019 for counterpart German Patent Application No. DE 10 2018 112 722.7.

* cited by examiner

*Primary Examiner* — Eric S. McCall
*Assistant Examiner* — Timothy P Graves
(74) *Attorney, Agent, or Firm* — Shuttleworth & Ingersoll, PLC; Timothy J. Klima

(57) ABSTRACT

A measuring device with at least one fluid channel for conveying a measuring fluid, wherein the fluid channel includes at least one inlet for the entry of the measuring fluid into the fluid channel and at least one outlet for the exit of the measuring fluid from the fluid channel.

The fluid channel includes a diamond-shaped cross-section and includes a course from the at least one inlet to the at least one outlet over which the measuring fluid entering the fluid channel is deflected by at least 90° before the measuring fluid exits the fluid channel at the at least one outlet.

17 Claims, 8 Drawing Sheets

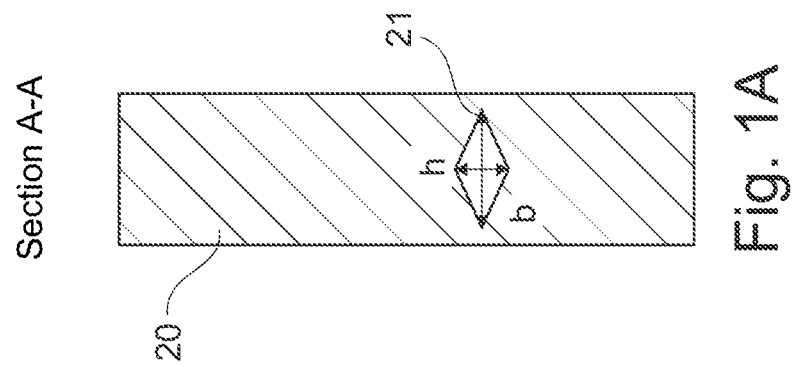
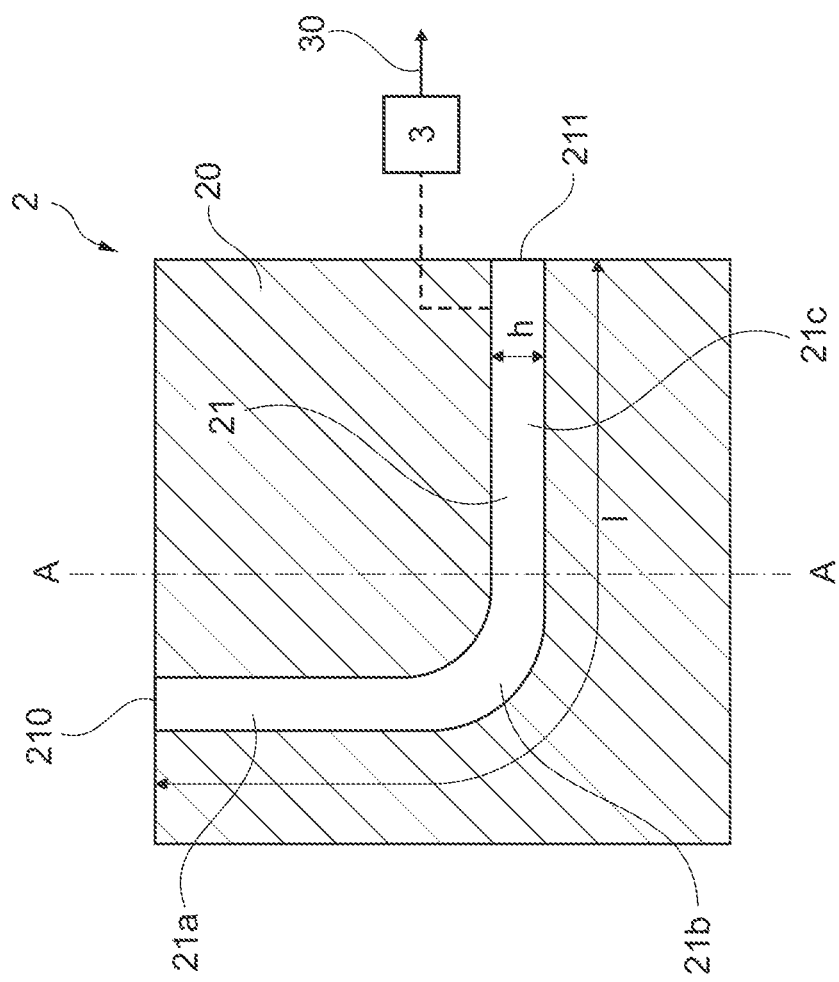

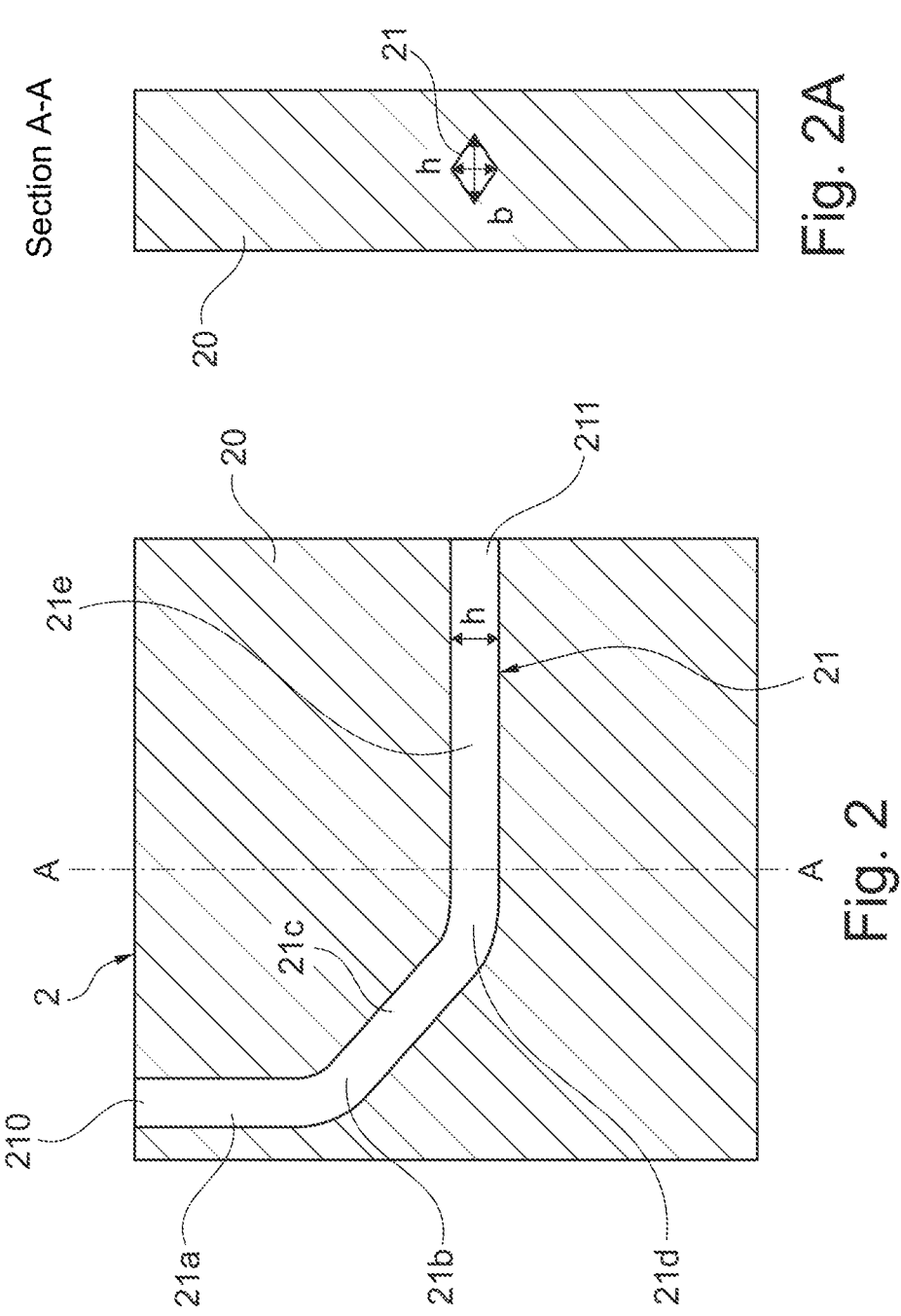

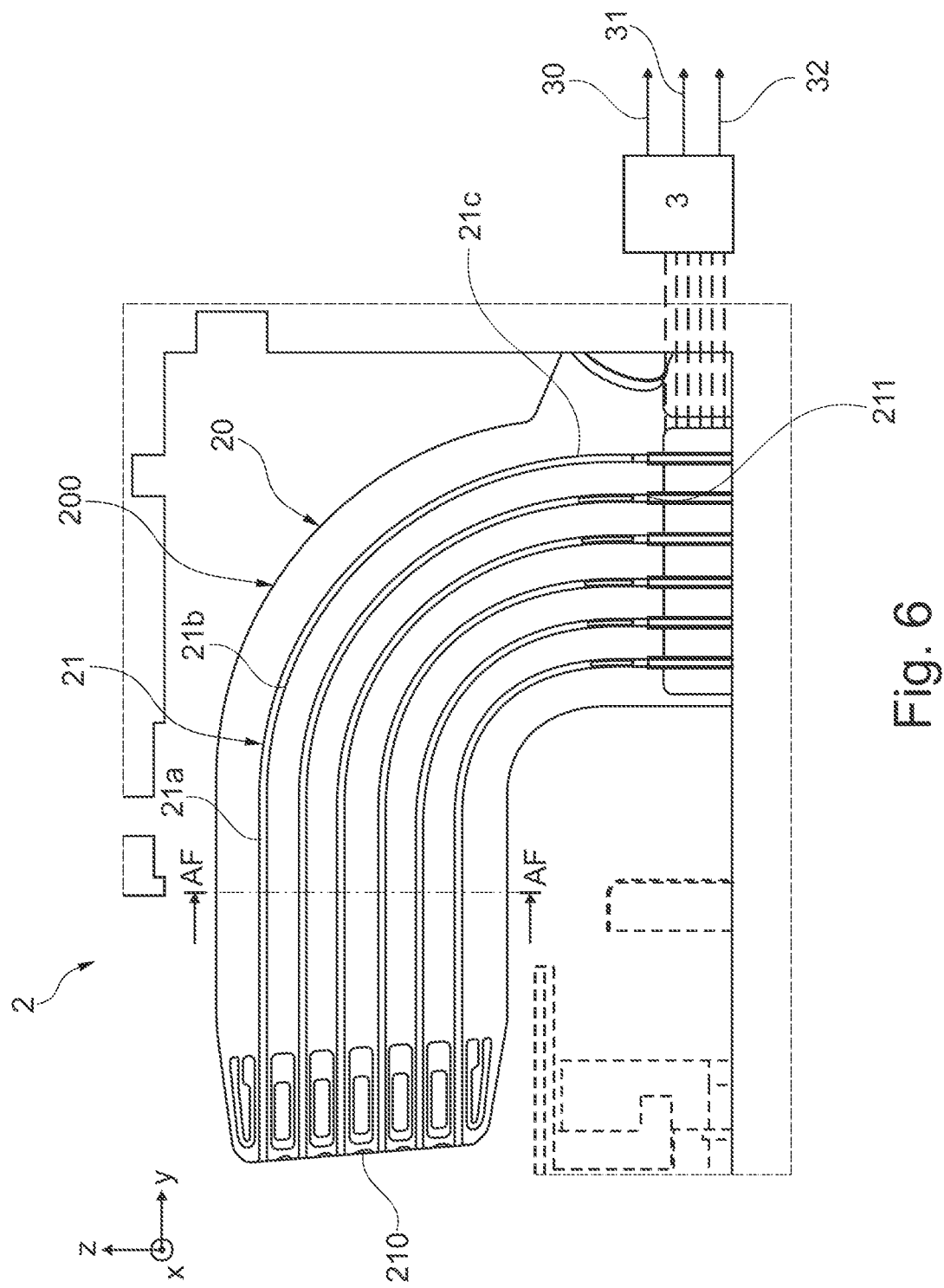

MEASURING DEVICE COMPRISING AT LEAST ONE FLUID CHANNEL FOR GUIDING A MEASUREMENT FLUID

This application claims priority to German Patent Application DE102018112722.7 filed May 28, 2018, the entirety of which is incorporated by reference herein.

The proposed solution concerns a measuring device with at least one fluid channel for conveying a measuring fluid.

Measuring devices are widely known, especially in the engine sector. For example, in the form of probes measuring devices with at least one fluid channel are used for different purposes, for example to take samples from a gas stream to determine the composition or to measure the dynamic pressure, as well as for speed and/or temperature measurement. For example, dynamic pressure probes on the aircraft and in the engine are also used to carry out engine or component tests on the ground.

It is absolutely common to such measuring devices to provide of at least one fluid channel through which a measuring fluid is conveyed in order to generate a measurement signal, for example for a composition or a dynamic pressure. Typically, measuring devices are assembled with a fluid channel of several semi-finished products. For example, larger pipes are used for the structure and smaller pipes for conveying air and thus for the formation of the fluid channel in the interior. The individual components must then be connected in a gastight manner, for example by hard soldering in the furnace (when manufacturing from a metallic material) or by gluing (especially when manufacturing from a plastic). However, such processes are comparatively costly and difficult to control reliably.

There is therefore a need for a measuring device that is improved in this regard, which can be used for an engine, for example.

Against this background, a measuring device is proposed that comprises at least one fluid channel for conveying a fluid with at least one inlet for the entry of the measuring fluid into the fluid channel and at least one outlet for the exit of the fluid from the fluid channel. The fluid channel also has a diamond-shaped cross-section at least in one section, as well as a course from the at least one inlet to the at least one outlet, by means of which the measuring fluid entering the fluid channel is deflected by at least 90° before the measuring fluid exits the fluid channel at the at least one outlet By deflecting the measuring fluid by more than 90° in the fluid channel, for example the inlet of the fluid channel can be positioned so as to be comparatively exposed on or in the engine or off the engine on an aircraft. By means of the fluid channel, the measuring fluid can be conveyed to spaced apart analysis electronics for the generation of a (measurement and/or analysis) signal. By deflecting the measuring fluid within the fluid channel by more than 90° from the at least one inlet to the at least one outlet, the inlet and outlet do not lie on a line of sight, which basically makes the production of the measuring device more difficult. However, by producing at least one fluid channel of the measuring device in an additive manufacturing process, more complex courses of a fluid channel can also be realized without the need to connect separate components. In this context in particular, the proposed diamond-shaped cross-section of the fluid channel is characterized by a great degree of flexibility. On the one hand, a diamond-shaped cross-section is not only easy to produce by means of an additive manufacturing process. On the contrary, owing to the diamond-shaped cross-section, for example, during the production process the orientation of the fluid channel in the powder bed can be comparatively freely selected.

In the context of the proposed solution, it is not mandatory for the measuring fluid to be deflected by more than 90° by means of a single curved or kinked section in the fluid channel. The deflection of the measuring fluid by more than 90° from the at least one inlet to the at least one outlet can also be staged or carried out continuously over several successive sections along a longitudinal extension direction of the fluid channel.

In one embodiment variant, the fluid channel includes at least one arc (channel) section. In the at least one arc section, the measuring fluid is conveyed within the fluid channel along a circular arc in the broadest sense. In this case, the at least one arc-shaped section can have a bend angle of more than 30°, in particular of more than 90°, for the deflection of the measuring fluid.

In one embodiment variant, the fluid channel includes several (at least two) arc-shaped sections. An arc angle of said sections can be identical to or different from each other. In particular, the fluid channel may contain at least two arc sections, each with a bend angle of more than 90°.

In particular, exemplary embodiments of the proposed measuring device provide for the fluid channel to have an L-shaped or Z-shaped course.

In one embodiment variant, the diamond-shaped cross-section is defined by a height and a width, wherein the height and/or the width range from 0.4 mm to 3 mm. The proposed dimensions are particularly suitable for measuring devices in the form of probes to be provided on an aircraft and/or on or in an engine. In general, the cross-sectional area of the fluid channel can be adjusted in a controlled manner by means of the exact definition of the width and height of the diamond-shaped cross-section.

Alternatively or additionally, the fluid channel has a length of at least 50 mm. A length of the fluid channel, measured from the at least one inlet to the at least one outlet, of at least 50 mm allows a sufficient mass flow and/or volume flow of the measuring fluid conveyed through the fluid channel to be able to obtain meaningful measurement and/or analysis signals, especially for measuring devices in the form of probes. In general, however, applications are conceivable in which the fluid channel has a length of less than 50 mm.

In one embodiment variant, the measuring device includes several fluid channels for determining different measurement data based on the measuring fluid conveyed by the plurality of fluid channels. Thus, the different fluid channels can be assigned to the generation of different measurement signals. For example, while a first fluid channel is associated with a pressure measurement, a second and third fluid channels are assigned to a temperature measurement or a measurement of a composition of the measurement fluid. The plurality of fluid channels can be formed within a common (device) body and comprise a diamond-shaped cross-section as well as a course over which the measuring fluid is deflected by more than 90°.

To determine measurement data, the measuring device may include analysis electronics. Said analysis electronics are then configured to determine measurement data based on the measuring fluid conveyed by at least one fluid channel. Analysis electronics can then, for example, generate appropriate measurement signals or analysis signals obtained on the basis of the measurement data and make them available for further processing. A measurement signal is a physical parameter, such as a temperature or pressure. An analysis signal, on the other hand, is understood for example as a signal generated by processing a measurement signal in the analysis logic, which for example resulted from a comparison of a measurement signal with a threshold value deposited in the analysis logic.

In one embodiment variant with a plurality of fluid channels, analysis electronics may be configured in particular to determine measurement data using the measuring fluid conveyed by the multiple fluid channels and to generate at least two different signals based on the measurement data, in particular two different types of signals (measurement signal or analysis signal) as well as two different measurement or analysis signals In one embodiment variant, the measuring device has a (device) body in which at least one fluid channel and at least one cooling channel are provided. The at least one cooling channel is designed and provided, for example, to convey a cooling medium. Cooling medium conveyed in the at least one cooling channel may be provided in particular for cooling the fluid channel or the measuring fluid conveyed therein. However, this is not mandatory.

In a development, for example three cooling channels are provided, which are grouped around the at least one fluid channel in a cross-sectional view through the body. In particular, a grouping around the fluid channel implies that in the cross-sectional view the fluid channel is arranged centrally between the at least two cooling channels, whereby the cooling channels can be evenly or unevenly arranged around the centrally located fluid channel. In a further useful development, for example, four cooling channels are provided.

In one embodiment variant, the measuring device comprises cooling channels with an (average) cross-sectional area that is a multiple greater than an (average) cross-sectional area of at least one fluid channel. The larger cross-sectional area of a cooling channel may be responsible, for example, for the achievement of a greater cooling effect.

In one exemplary embodiment, a plurality of fluid channels of the measuring device are arranged side by side along a cross-sectional axis running through the body. Along the cross-sectional axis and perpendicular to the cross-sectional axis, a plurality of cooling channels can also be grouped around the plurality of fluid channels, so that a row of fluid channels provided along the cross-sectional axis can be surrounded by a plurality of cooling channels in a cross-sectional view to keep the measuring fluid conveyed in the fluid channels within a predetermined temperature range. For example, two or more rows of cooling channels extend parallel to the cross-sectional axis and two or more (possibly parallel) rows of cooling channels are provided perpendicular to the cross-sectional axis. In this way, the multi-row cooling channels surround a row of fluid channels.

Regardless of the number and orientation of fluid channels and cooling channels, one embodiment variant may provide for the body of the measuring device to be formed with at least one section with an elliptical cross-section, in which the at least one fluid channel and at least one cooling channel are provided. A section with an elliptical cross-section is to be understood in particular to be a section that has a contour in the cross-section in which two arc-shaped end sections are connected by a middle section, which is bounded by straight-line edges. Such a cross-sectional form of a body comprising at least one fluid channel and one cooling channel can be particularly beneficial in a probe in order to accommodate several different fluid channels and cooling channels as compactly as possible.

Basically, an outer shell of a body of the measuring device in which the fluid channel is provided may have a coating. For example, a ceramic or mineral coating may be provided. The respective coating can be applied chemically or physically. Appropriate protective coatings on the body of the measuring device may be necessary, especially in use on or in an engine, in order to meet the demanding operating environment.

As stated at the outset, a proposed measuring device can be produced using, for example, an additive manufacturing process. The at least one fluid channel of the measurement device is then used, for example, by a DLD process ("DLD" for "Direct Laser Deposition") or a DMLS method ("DMLS" for "Direct Metal Laser Sintering", also known as selective laser smelting).

Following the production of a body with at least one fluid channel by means of an additive manufacturing process, a coating can be applied to an outer shell of the body. For example, a ceramic or mineral coating can be externally applied chemically or physically.

Additionally, the proposed solution also concerns a gas turbine engine with at least one embodiment variant of a proposed measuring device and, alternatively or additionally, an aircraft with at least one proposed measuring device.

The accompanying figures illustrate examples of possible embodiment variants of the proposed solution.

In the figures:

FIG. 1 shows a cross-sectional view of a first exemplary embodiment with an L-shaped fluid channel within a body of the measuring device;

FIG. 1A shows a sectional representation along the section line A-A of FIG. 1,

FIG. 2 shows a cross-sectional view of a second exemplary embodiment with a fluid channel that is curved in stages within a body of the measuring device;

FIG. 2A shows a sectional representation along the section line A-A of FIG. 2;

FIG. 6 shows sectionally in a side view an exemplary embodiment of a measuring device in the form of a probe with a plurality of mutually parallel fluid channels, around which a plurality of cooling channels are grouped;

Figure 7:
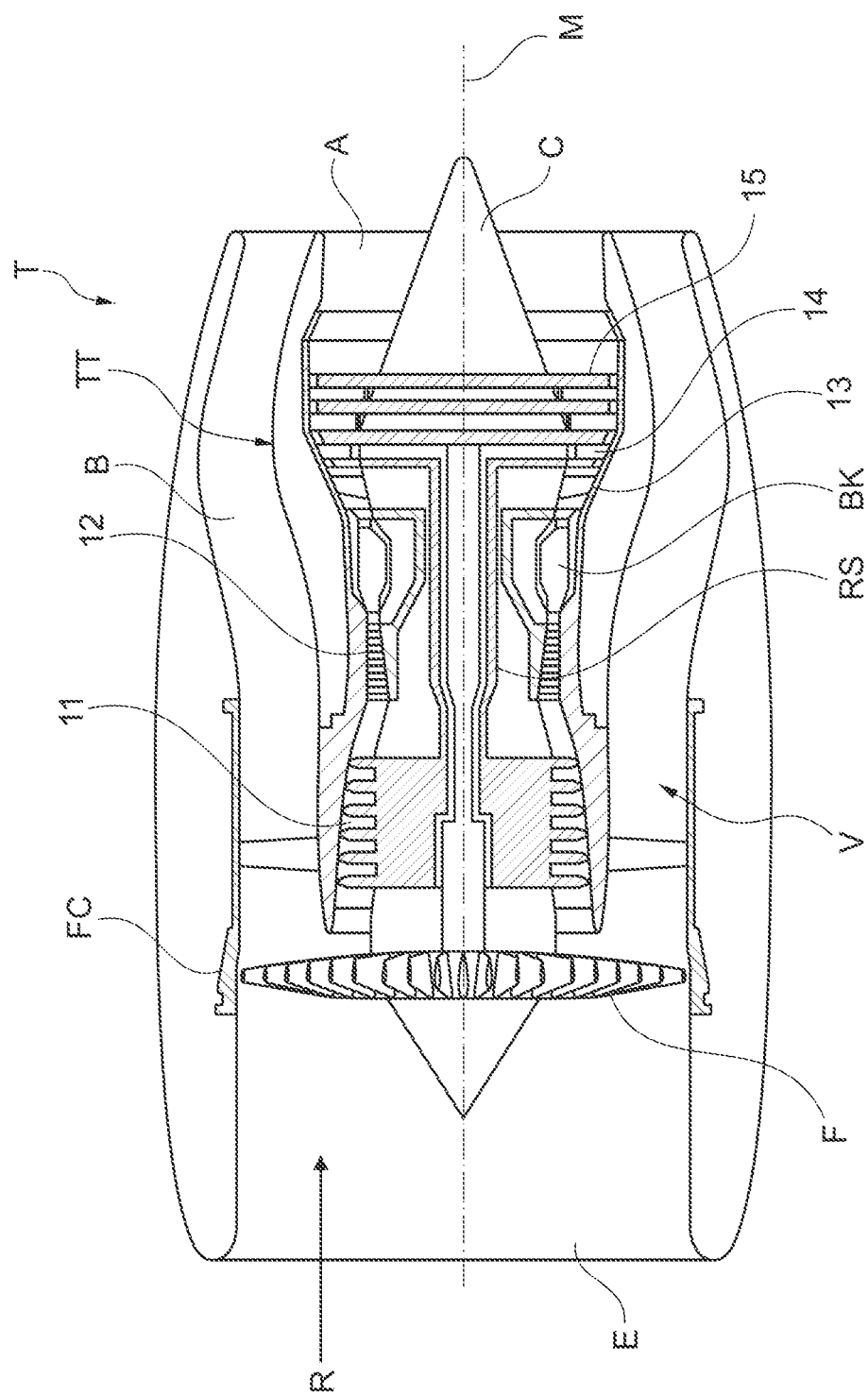
FIG. 7 shows schematically and in a sectional representation a gas turbine engine on or in which a proposed measuring device is used.

FIG. 7 illustrates schematically and in a sectional representation a gas turbine engine T, in which the individual engine components are arranged in succession along a rotation axis or central axis M and the engine T is embodied as a turbofan engine. At an inlet or intake E of engine T, air is sucked along an entry direction R using a fan F. Said fan F, arranged in a fan casing FC, is driven by a rotor shaft RS, which is rotated by a turbine TT of the engine T. The Turbine TT is connected to a compressor V, which for example has a low pressure compressor 11 and a high pressure compressor 12, as well as a medium pressure compressor if necessary. The fan F supplies air to the compressor V on the one hand and a secondary current channel or bypass channel B on the other to generate the thrust. The bypass channel B is based around a core engine comprising the compressor V and the turbine TT, which comprises a primary power channel for the air supplied to the core engine by the fan F.

The air conveyed by means of the compressor V into the primary current channel enters a combustion chamber section BK of the core engine, in which the propulsion energy is generated to drive the turbine TT. The turbine TT has a high pressure turbine 13, a medium pressure turbine 14 and a low pressure turbine 15. The turbine TT drives the rotor shaft S and thus the fan F by means of the energy released during combustion in order to generate the necessary thrust via the air extracted into the bypass channel B. Both the air from the bypass channel B and the exhaust gases from the primary power channel of the core engine flow out via an outlet A at the end of the engine T. The outlet A usually comprises a thruster nozzle with a centrally arranged exit cone C.

On or in the engine T, there is basically a need for measuring devices, for example in the form of probes, by means of which different measurement data can be obtained from a flowing fluid. For example, such measuring devices are provided to take samples from a gas stream to determine the composition or to measure the dynamic pressure, as well as for speed and/or temperature measurement. FIGS. 1-1A, 2-2A, 3-3A, 4, 5 and 6-6A show different variants of measuring devices 2 in the form of probes, for example in the form of exhaust gas probes, which can be used on or in the engine T of FIG. 7. Each of said measuring devices 2 has at least one fluid channel 21 with a diamond-shaped cross-section as well as a course by means of which, starting from an inlet 210 of the fluid channel 21 to an outlet 211 of the fluid channel 21, measuring fluid conveyed in the fluid channel 21, for example air, is deflected by more than 90°. All embodiment variants of FIGS. 1 to 6A are produced from metal or plastic using an additive production process, for example in a DLD or DMLS process. A length l of each fluid channel 21 of the represented embodiment variant is at least 50 mm. Furthermore, at least one width b and a height h of the diamond-shaped cross-section each lies in the range of 0.4 mm to 3 mm.

In the embodiment variant of FIGS. 1 and 1A, the measuring device 2 comprises a probe body 20 with an internal, integrated fluid channel 21 that is L-shaped in cross-section. Over the length l, the fluid channel 21 comprises three successive sections 21a, 21b and 21c starting from the inlet 210 towards the outlet 211. The two straight, but rotated 90° with respect to each other, channel sections 21a and 21c of the fluid channel 21 are joined to each other by a central arc-shaped section 21b. Said arc-shaped channel section 21b therefore has a bend angle of 90°.

Part of the measuring device 2 is analysis electronics 3. Said analysis electronics 3 are assigned to the fluid channel 21 and are configured for the automatic generation of a measurement or analysis signal 30, which is generated on the basis of the measuring fluid flowing through the fluid channel 21. The analysis electronics 3 are coupled to a sensor provided on or in the fluid channel 21, for example.

In the embodiment variant of FIGS. 2 and 2A, the fluid channel 21 of the measuring device 2 is formed in the probe body 20 over more than three interconnected channel sections 21a to 21c. In this case, a first channel section 21a extending in a straight line and connected to the inlet 210 is again oriented at an angle of 90° to an equally straight line channel section 21e that opens into the outlet 211. Said two channel sections 21a and 21e are connected to each other by means of several, in the present case three, channel sections 21b, 21c and 21d. Two arc-shaped channel sections 21b and 21d are connected to each other by a straight middle channel section 21c. The arc-shaped channel sections 21b and 21d each have a bend angle in the region of 45°.

Figure 3A:
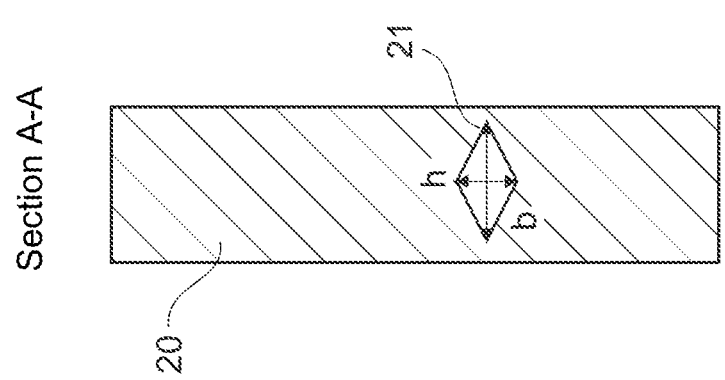
FIG. 3A shows a sectional representation along the section line A-A of FIG. 3.
Figure 3:
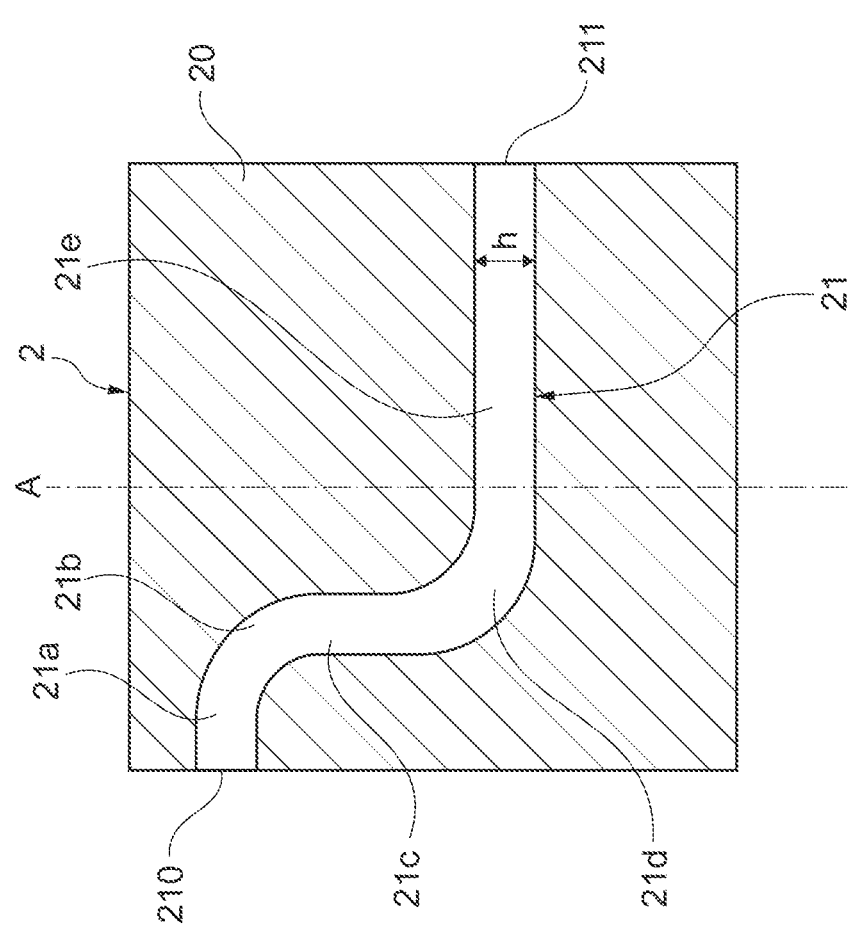
FIG. 3 shows a cross-sectional view of a third exemplary embodiment with a Z-shaped fluid channel within a body of the measuring device.

In the embodiment variant of FIGS. 3 and 3A, the probe body 2 has an integrated fluid channel 21 with a Z-shaped course. Starting from inlet 210 to outlet 211, several channel sections 21a to 21e are connected to each other along a longitudinal extension direction of the fluid channel 21. Two arc-shaped channel sections 21b and 21d, each defining a bend angle of 90°, are bent in different directions to form the Z-shaped course of the fluid channel 21.

Figure 4:
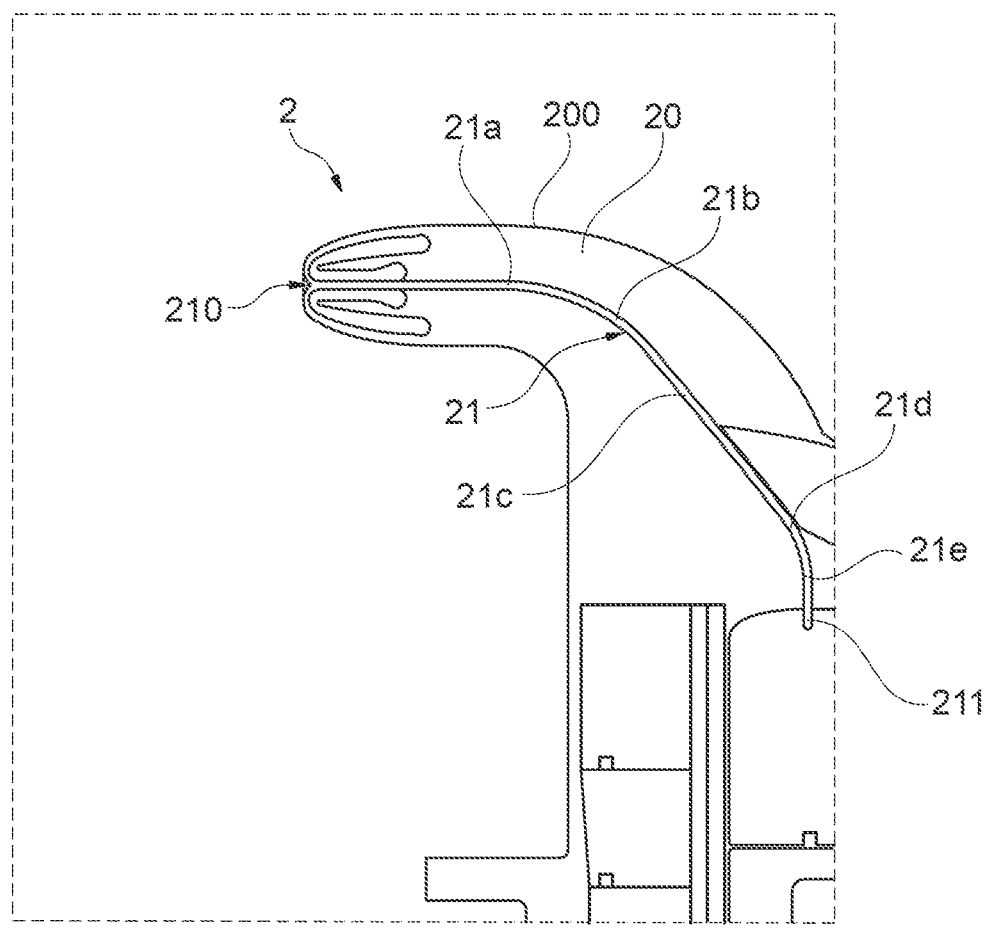
FIG. 4 shows sectionally and in a sectional view an embodiment variant of the proposed measuring device in the form of a probe.

In the embodiment variant of FIG. 4, the probe body 20 forms a probe head 200, on which the inlet 210 of the fluid channel 21 is provided. The additively manufactured probe body 20 is part of an exhaust gas probe, for example. The course of the fluid channel 21 provided here is based on the embodiment variant of FIGS. 2 and 2A and comprises a plurality of differently curved channel sections 21b and 21d joined to each other by a straight channel section 21c.

Figure 5:
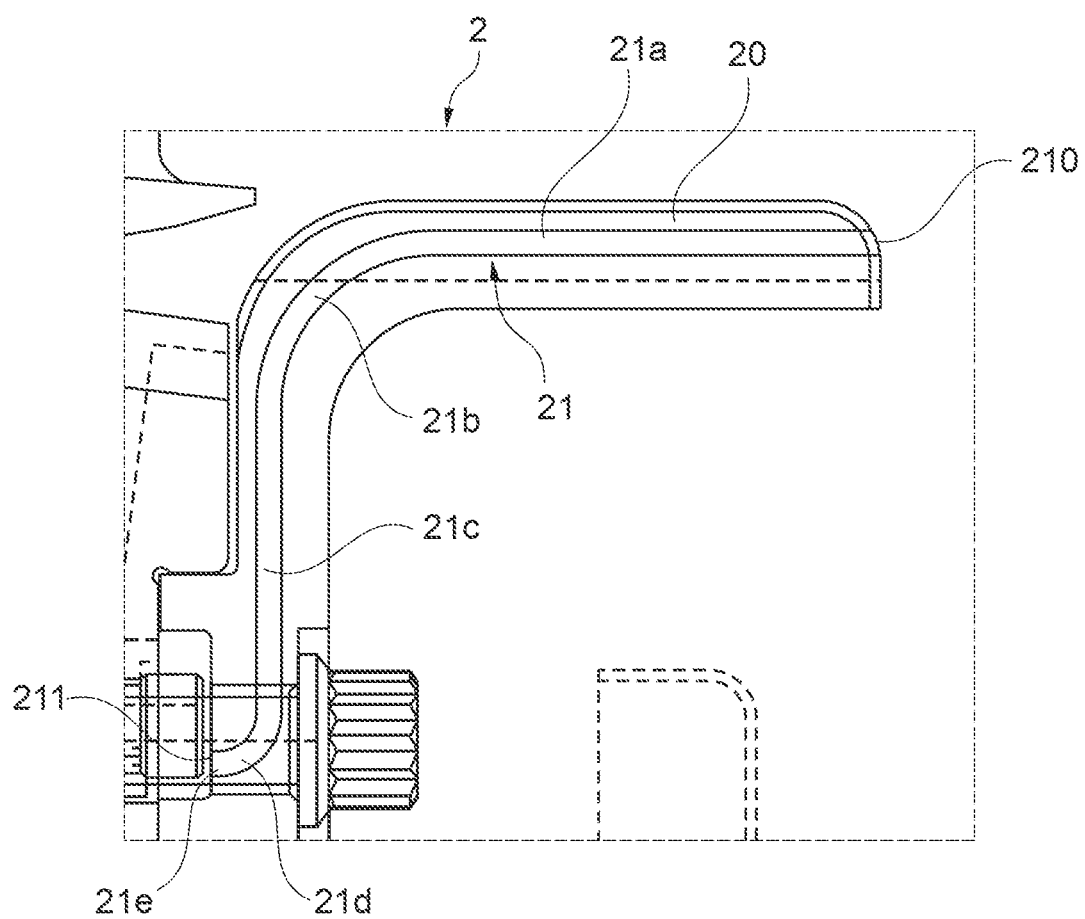
FIG. 5 shows sectionally and in a side view another embodiment variant of a measuring device in the form of a probe with a Z-shaped fluid channel.

In the embodiment variant of FIG. 5, the probe body 20 is L-shaped and integrates within it a Z-shaped fluid channel 21.

Figure 6A:
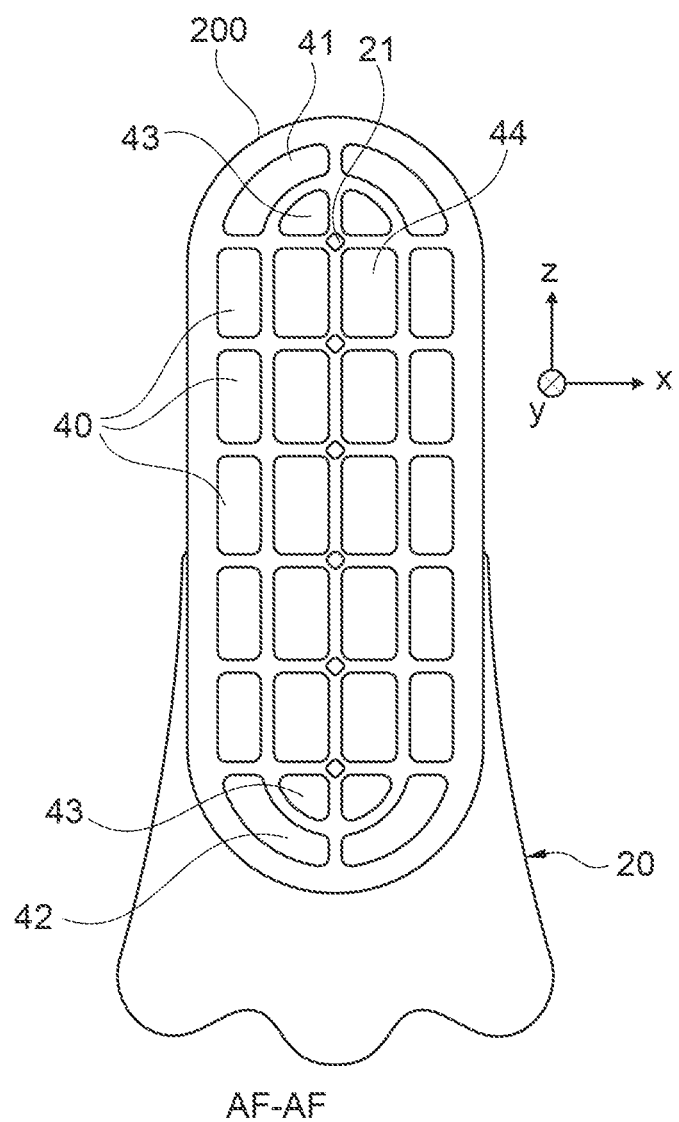
FIG. 6A shows a sectional view along the section line AF-AF of FIG. 6.

FIGS. 6 and 6A show different views of another embodiment variant of a measuring device 2. In this embodiment variant, a probe body 20 of the measuring device forms an L-shaped probe head 200. In the probe body 20, several L-shaped and parallel fluid channels 21 are provided. In a cross-sectional view according to FIG. 6A, the individual fluid channels 21 are disposed adjacent to each other or one above the other within the probe body 20 along a cross-sectional axis in a spatial direction z.

The different fluid channels 21 can be provided to determine different measurement data and therefore for the generation of different measurement and analysis signals 30, 31 and 32 using the analysis electronics 3.

The probe head 200 of the embodiment variant of FIGS. 6 and 6A has a cross-section in which two arc-shaped end sections are connected to each other by a middle section, which is bounded by straight edges. Centrally within this cross-section, which is referred to as elliptical, the fluid channels 21 are provided in a row side by side. A plurality of cooling channels 40, 41, 42 and 44 are grouped around said row of fluid channels 21.

The cooling channels 40 to 44 comprise different cross-sections from the diamond-shaped cross-section of the fluid channels 21 in the present case, but can in principle also have a diamond-shaped cross-section. The cross-sectional areas of the cooling channels 40 to 44 are each a multiple greater than the cross-sectional areas of the fluid channels 21.

Furthermore, the cooling channels 40 to 44 are grouped around the fluid channels 21 in such a way that each fluid channel 21 is framed by four cooling channels 43/44. Four cooling channels 43/44 are grouped around a centrally arranged fluid channel 21, so that the row of fluid channels 21 extends between two rows of cooling channels 43/44. A cooling channel arrangement with additional cooling channels 40/41, which is circumferentially encircling in the cross-sectional view, is provided around the defined arrangement with the central row of fluid channels and the two rows of cooling channels 43/44. The cooling channels 40/44 are thus on the one hand in parallel with the row of fluid channels 21 and thus arranged in the spatial direction z. In addition, several parallel rows of cooling channels 40/44 are provided in the spatial direction x and transverse to the spatial direction z.

REFERENCE CHARACTER LIST

11 Low pressure compressor
12 High pressure compressor
13 High pressure turbine
14 Medium pressure turbine
15 Low pressure turbine
2 Measuring device
20 Probe body
200 Probe head
21 Fluid channel
210 (Channel) inlet
211 (Channel) outlet
21a-21e Channel section
3 Analysis electronics
30, 31, 32 Signal
40-44 Cooling channel
A Outlet
B Bypass Channel
BK Combustion chamber section
C Outlet cone
E Inlet/intake
F Fan
FC Fan housing
h Height
l Length
M Central axis/rotation axis
R Direction of entry
RS Rotor shaft
T Turbofan engine (gas turbine engine)
TT Turbine
V Compressor

The invention claimed is:

1. A gas turbine engine, comprising:
   a measuring device, comprising:
      at least one fluid channel for conveying a measuring fluid, whereby the fluid channel comprises at least one inlet for entry of the measuring fluid into the fluid channel and at least one outlet for exit of the measuring fluid from the fluid channel,
      wherein the fluid channel comprises a diamond-shaped cross-section and from the at least one inlet to the at least one outlet comprises a course over which the measuring fluid entering the fluid channel is deflected by at least 90° before the measuring fluid exits the fluid channel at the at least one outlet.

2. The gas turbine engine according to claim 1, wherein the fluid channel contains at least one arc-shaped section.

3. The gas turbine engine according to claim 2, wherein the at least one arc-shaped section has a bend angle of more than 30° for the deflection of the measuring fluid.

4. The gas turbine engine according to claim 3, wherein the at least one arc-shaped section has a bend angle of more than 90° for the deflection of the measuring fluid.

5. The gas turbine engine according to claim 2, wherein the at least one arc-shaped section includes a plurality of arc-shaped sections.

6. The gas turbine engine according to claim 5, wherein the at least one arc-shaped section includes at least two arc-shaped sections, each with a bend angle of more than 90°.

7. The gas turbine engine according to claim 1, wherein the fluid channel comprises an L-shaped or a Z-shaped course.

8. The pas turbine engine according to claim 1, wherein the diamond-shaped cross-section is defined by a height and a width, and the height and/or the width are in the range of 0.4 mm to 3 mm.

9. The gas turbine engine according to claim 1, wherein the fluid channel has a length of at least 50 mm.

10. The gas turbine engine according to claim 1, wherein the at least one fluid channel includes a plurality of fluid channels configured for determination of different measurement data using the measuring fluid conveyed through the plurality of fluid channels.

11. The gas turbine engine according to claim 10, and further comprising analysis electronics configured to determine measurement data using the measuring fluid conveyed through the at least one fluid channel.

12. The gas turbine engine according to claim 11, wherein the analysis electronics are configured to determine measurement data using the measuring fluid conveyed through the plurality of fluid channels and to determine at least two different signals based on the measurement data.

13. The gas turbine engine according to claim 1, wherein the measuring device comprises a body in which the at least one fluid channel and at least one cooling channel are provided.

14. The gas turbine engine according to claim 13, wherein the at least one cool nq channel includes at least three cooling channels that are grouped around the at least one fluid channel in a cross-sectional view through the body.

15. An aircraft comprising:
    a measuring device, comprising:
       at least one fluid channel for conveying a measuring fluid, whereby the fluid channel comprises at least one inlet for entry of the measuring fluid into the fluid channel and at least one outlet for exit of the measuring fluid from the fluid channel,
       wherein the fluid channel comprises a diamond-shaped cross-section and from the at least one inlet to the at least one outlet comprises a course over which the measuring fluid entering the fluid channel is deflected by at least 90° before the measuring fluid exits the fluid channel at the at least one outlet.

16. A measuring device for an engine, comprising:
    at least one fluid channel for conveying a measuring fluid, whereby the fluid channel comprises at least one inlet for entry of the measuring fluid into the fluid channel and at least one outlet for exit of the measuring fluid from the fluid channel,
    wherein the fluid channel comprises a diamond-shaped cross-section and from the at least one inlet to the at least one outlet comprises a course over which the measuring fluid entering the fluid channel is deflected by at least 90° before the measuring fluid exits the fluid channel at the at least one outlet; and
    a body in which the at least one fluid channel and at least one cooling channel are provided.

17. The measuring device according to claim 16, wherein the at least one cooling channel includes at least three cooling channels that are grouped around the at least one fluid channel in a cross-sectional view through the body.

* * * * *